United States Patent
Kawauchi et al.

(10) Patent No.: US 7,701,841 B2
(45) Date of Patent: Apr. 20, 2010

(54) OFDM DEMODULATING APPARATUS AND METHOD

(75) Inventors: Hidetoshi Kawauchi, Kanagawa (JP);
Toshihisa Hyakudai, Chiba (JP);
Takuya Okamoto, Tokyo (JP); Atsushi Yajima, Tokyo (JP); Taku Yamagata, Tokyo (JP); Kazutaka Yamamoto, Kanagawa (JP); Shigenari Kawabata, Kanagawa (JP)

(73) Assignee: Sony Corporation (JP)

( * ) Notice: Subject to any disclaimer, the term of this patent is extended or adjusted under 35 U.S.C. 154(b) by 856 days.

(21) Appl. No.: 11/489,161

(22) Filed: Jul. 19, 2006

(65) Prior Publication Data

US 2007/0070882 A1 Mar. 29, 2007

(30) Foreign Application Priority Data

Jul. 19, 2005 (JP) ............................ P2005-208679

(51) Int. Cl.
*H04J 11/00* (2006.01)
(52) U.S. Cl. ..................... 370/210; 370/208; 375/260
(58) Field of Classification Search ......... 370/206–210; 375/260, 147, 148, 150
See application file for complete search history.

(56) References Cited

U.S. PATENT DOCUMENTS 6,785,257 B1 * 8/2004 Miyatani .................. 370/342
7,313,171 B2 * 12/2007 Bilgic et al. ............... 375/148
2004/0105512 A1 6/2004 Priotti

FOREIGN PATENT DOCUMENTS

| EP | 1392015 | 2/2004 |
|---|---|---|
| EP | 1478150 | 11/2004 |
| JP | 2001-292125 A | 10/2001 |
| JP | 2002-368717 A | 12/2002 |
| JP | 2004-153831 A | 5/2004 |

* cited by examiner

*Primary Examiner*—Ian N Moore
*Assistant Examiner*—Peter Cheng
(74) *Attorney, Agent, or Firm*—Lerner, David, Littenberg, Krumholz & Mentlik, LLP

(57) ABSTRACT

An orthogonal frequency division multiplexing (OFDM) demodulating apparatus includes a delay profile creating section, a Fourier converting section, a pilot signal extracting section, a transmission path characteristic estimating section, an inverse Fourier converting section, and a window control section. In this case, the window control section creates a delay profile for defining a calculation range by leaving a path which exists at a same position in both the delay profiles created by the delay profile creating section and the inverse Fourier converting section and the number of times of detection which is equal to or higher than a threshold value and defines a higher threshold value for the path at a predetermined position from the position of the main path within the delay profile created by the inverse Fourier converting section than for the paths at the other positions.

5 Claims, 14 Drawing Sheets

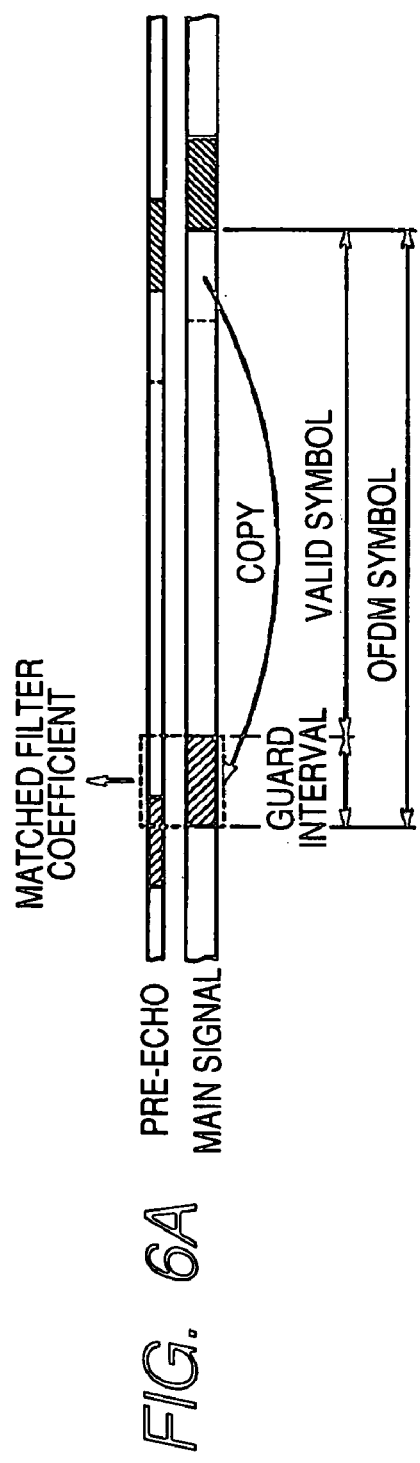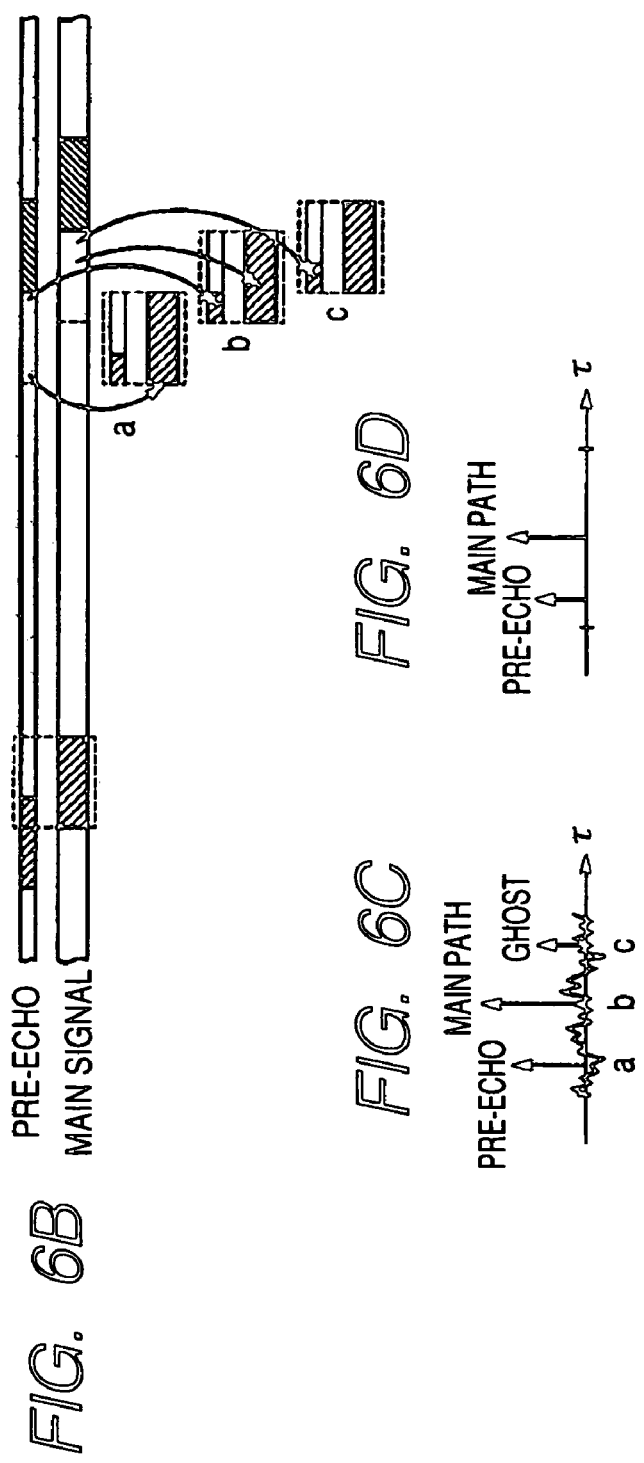

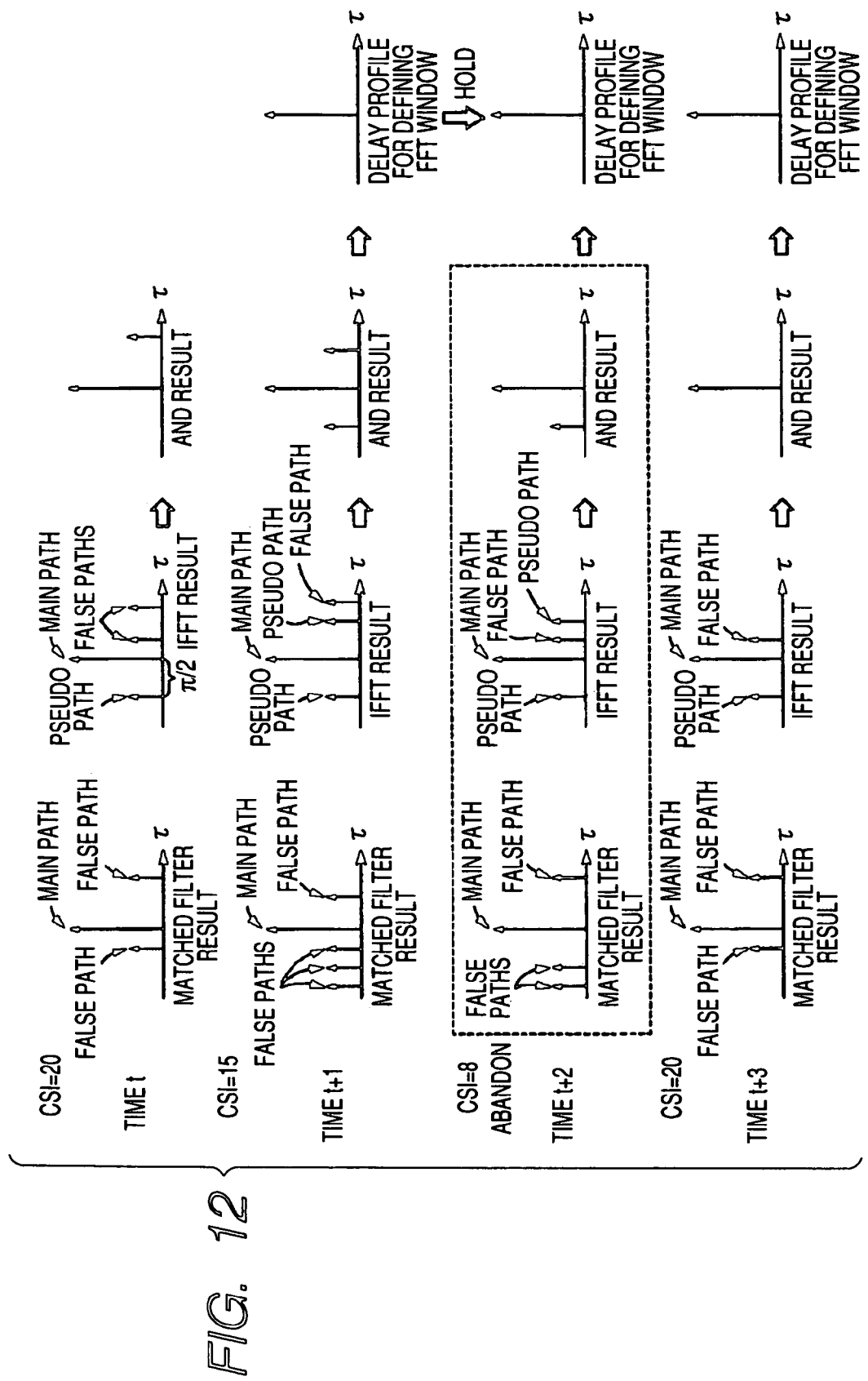

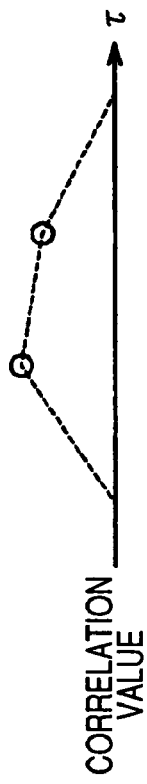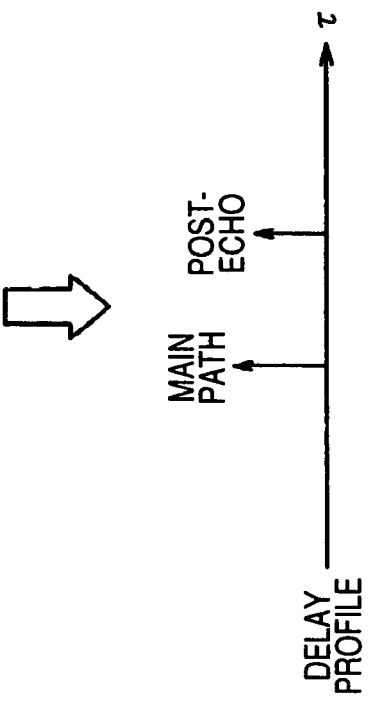
FIG. 13A
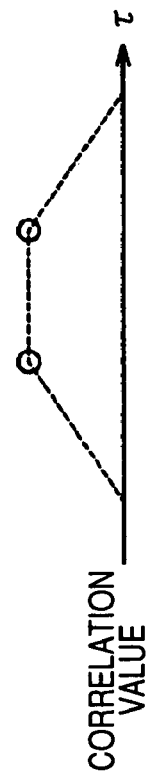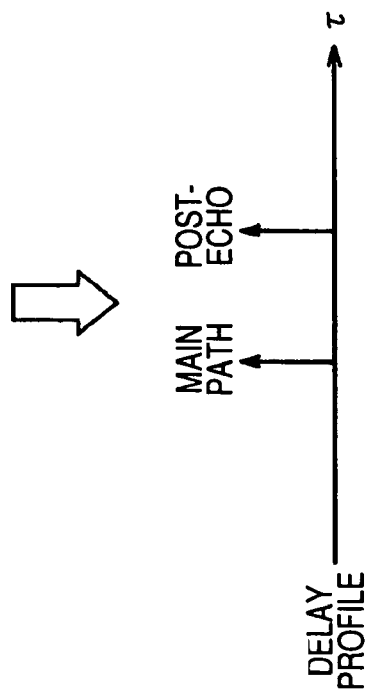
FIG. 13B

OFDM DEMODULATING APPARATUS AND METHOD

CROSS-REFERENCE TO RELATED APPLICATIONS

The present application claims priority from Japanese Patent Application No. JP 2005-208679 filed on Jul. 19, 2005, the disclosure of which is hereby incorporated by reference herein.

BACKGROUND OF THE INVENTION

1. Field of the Invention

The present invention relates to an orthogonal frequency division multiplexing (OFDM) demodulating apparatus and method thereof that demodulates an OFDM signal.

2. Description of the Related Art

In recent years, a modulating method called Orthogonal Frequency Division Multiplexing method (called OFDM method hereinafter) has been proposed for modulating digital data. In OFDM method, data is assigned and is digitally modulated to the amplitude and phase of each of many orthogonal sub-carriers within a transmission band by PSK (Phase Shift Keying) or a QAM (Quadrature Amplitude Modulation).

OFDM method has been widely considered to apply to terrestrial digital broadcasting, which is susceptible to multi-path interference.

A send signal by OFDM method is transmitted in symbols called OFDM symbols as shown in FIG. 14. The OFDM symbol includes a valid symbol and a guard interval. The valid symbol is a signal period when IFFT (Inverse Fast Fourier Transform) is performed upon transmission. The guard interval is a copy of the waveform of a part of the second half of the valid symbol. The guard inertial is provided in the first half of the OFDM symbol and may have a time length of ¼ or ⅛ of that of the valid symbol, for example.

In an OFDM receiving apparatus that receives the OFDM signal, FFT (Fast Fourier Transform) calculation is performed thereon by an FFT calculating circuit, whereby the received OFDM signal is demodulated. From the OFDM symbol including a valid symbol and a guard interval, the OFDM receiving apparatus detects the boundary position of the OFDM symbol, defines a calculation range (called FFT window) of a length equal to that of the valid symbol from the detected symbol boundary position, identifies the data of the part defined by the FFT window from the OFDM symbol and performs FFT calculation thereon.

By the way, terrestrial broadcasting is a transmission path in a multipath atmosphere. In other words, terrestrial broadcasting is susceptible to the interference by delay waves due to the surroundings such as the surrounding geography and buildings at the receiving point, and the signal received by an OFDM receiving apparatus becomes a composite wave resulting from the combination of multiple delay waves.

In the transmission path in a multipath atmosphere, multiple symbol boundaries exist because of the existence of multiple paths. In this case, the inter-symbol interference may be generally avoided by defining the position of an FFT window based on the position of the symbol boundary of the first reached path.

Here, a method of defining the position of an FFT window, which determines the position of FFT calculation, will be described (see JP-A-2002-368717 and JP-A-2001-292125).

A first method of defining an FFT window delays an OFDM signal before FFT calculation is performed thereon, obtains the correlation between the waveform of the guard interval part and the waveform of the second half of the OFDM symbol (that is, the signal waveform from which the guard interval is copied), and calculates the boundary of the OFDM symbol. In this method, the time exhibiting the peak value of the autocorrelation function is the boundary of the OFDM symbol of each path.

A second method applies scattered pilot signals (SP signals) with a specific level and specific phase, which are scattered at specific positions in an OFDM symbol. The method estimates the transmission path characteristic of all OFDM symbols by extracting the SP signal from an OFDM signal, removing the modulated component therefrom and performing interpolation thereon by using a time direction interpolation filter. Then, a delay profile exhibiting the signal strength of each path is created by performing IFFT calculation on the estimated transmission path characteristic, and the boundary of the OFDM symbol is obtained based on the first reached path. Notably, the time direction interpolation of SP signals is for increasing the range of the detection of a delay profile by decreasing the intervals of SP signals artificially.

In general, in defining an FFT window, the first method causes a rough trigger to an FFT window at the beginning of receipt, and, after a predetermined period of time of the continuation of the first method, the second method causes the trigger to an FFT window. In other words, the establishment of rough synchronization is followed by more accurate symbol synchronization, resulting in a stable reproduction state.

A third method of defining an FFT window is also known that extracts the waveform of a guard interval part from an OFDM signal before FFT calculation is performed thereon, obtains the coherence between the extracted waveform and the waveform of the second half of the OFDM symbol and thereby obtains the boundary of the OFDM symbol. This method creates a delay profile exhibiting the signal strength of each path by obtaining the coherence and obtains the boundary of the OFDM symbol based on the first reached path.

Furthermore, in recent years, a method including a combination of the second and third methods has been proposed (see JP-A-2004-153831). The method allows the elimination of a false path by combining the delay profiles created by the two methods even when a false path due to noise exists in the delay profiles.

The second method may require the agreement between the interpolation value and the real transmission path characteristic since the SP signals are interpolated in the time direction. However, in an atmosphere in motion, the transmission path characteristic fluctuates at a high Doppler frequency, and a wrong delay profile might be created when the time-direction interpolation processing does not satisfy the sampling theorem.

FIGS. 15A and 15B show examples of cases in which the time-dependent fluctuation of a transmission path characteristic satisfies and does not satisfy a sampling theorem, respectively. As shown in FIG. 15A, when the time-dependent fluctuation of a transmission path characteristic satisfies the sampling theorem, the interpolation values (indicated by circles in white) of the SP signals (indicated by circles in black) agree with the real transmission path characteristic. On the other hand, as shown in FIG. 15B, when the time-dependent fluctuation of the transmission path does not satisfy the sampling theorem, the interpolation value (circles in white) of the SP signals (circles in black) do not agree with the real transmission path characteristic, resulting in the wrong estimation of the transmission path characteristic as indicated by the shown broken line.

FIG. 16 shows a delay profile resulting from the IFFT calculation performed when the time-dependent fluctuation of the transmission path characteristic does not satisfy the sampling theorem. As shown in FIG. 16, when the time-dependent fluctuation of the transmission path characteristic does not satisfy the sampling theorem, some time-direction interpolation may cause a pseudo path, which does not really exist, in addition to the real path that really exists. The pseudo path occurs regularly at the position of a normalized frequency of $\pi/2$, $\pi$ or $3\pi/2$ from the position of the real path.

Since a delay profile includes a pseudo path when time-direction interpolation is performed on SP signals, the definition of an FFT window may require the determination of either real path or pseudo path in order not to obtain the boundary of an OFDM symbol based on a pseudo path.

While a false path due to noise occurs at a random position, the pseudo path continuously occurs at a same position. Thus, when the position of the pseudo path in the delay profile created by the second method agrees with the position of the false path in the delay profile created by the third method, the pseudo path may be misdetermined as a real path even though the delay profiles of both are applied. As a result, the precision of the estimation of the delay profiles decreases.

Furthermore, in an atmosphere in motion, the precision of the estimation of delay profiles also decreases when the SNR (Signal to Noise Ratio) is deteriorated by a factor such as a fall of signal power.

SUMMARY OF THE INVENTION

Accordingly, it is desirable to propose an OFDM demodulating apparatus and method thereof that allows the occurrence of the trigger to an FFT window based on a right delay profile even in an atmosphere in motion.

According to an embodiment of the present invention, there is provided an orthogonal frequency division multiplexing (OFDM) demodulating apparatus that handles a transmission symbol containing a valid symbol resulting from the modulation of multiple sub-carriers by multiple pieces of data resulting from the division of information and a guard interval resulting from a copy of a partial signal waveform of the valid symbol as a transmission unit and demodulates an OFDM signal with the transmission symbol having a predetermined sub-carrier discretely containing pilot signals with a specific amount of power and a specific phase, the apparatus including a delay profile creating section operable to create a delay profile from the OFDM signal by a predetermined method of a time domain; a Fourier converting section operable to define a calculation range for a valid symbol period from each transmission symbol of the OFDM signal and to perform a Fourier conversion on the defined calculation range; a pilot signal extracting section operable to extract, for each transmission symbol, the pilot signals from the signal converted by the Fourier converting section; a transmission path characteristic estimating section operable to estimate a transmission path characteristic of all of the transmission symbols by interpolating the pilot signals extracted by the pilot signal extracting section using a time-direction interpolation filter; an inverse Fourier converting section operable to create a delay profile by performing an inverse Fourier conversion, for each transmission symbol, on the transmission path characteristic estimated by the transmission path characteristic estimating section; and a window control section operable to create a delay profile for defining a calculation range based on the delay profile created by the delay profile creating section and the delay profile created by the inverse Fourier converting section and to control the calculation range based on the delay profile for defining a calculation range, wherein the window control section creates the delay profile for defining a calculation range by leaving a path which exists at a same position in both the delay profile created by the delay profile creating section and the delay profile created by the inverse Fourier converting section and the number of times of detection which is equal to or higher than a threshold value and defines a higher threshold value for the path at a predetermined position from the position of the main path within the delay profile created by the inverse Fourier converting section than for the paths at the other positions.

According to another embodiment of the invention, there is provided an orthogonal frequency division multiplexing (OFDM) demodulating apparatus that handles a transmission symbol containing a valid symbol resulting from the modulation of multiple sub-carriers by multiple pieces of data resulting from the division of information and a guard interval resulting from a copy of a partial signal waveform of the valid symbol as a transmission unit and demodulates an OFDM signal with the transmission symbol having a predetermined sub-carrier discretely containing pilot signals with a specific amount of power and a specific phase, the apparatus including a delay profile creating section operable to create a delay profile from the OFDM signal by a predetermined method of a time domain; a Fourier converting section operable to define a calculation range for a valid symbol period from each transmission symbol of the OFDM signal and to perform a Fourier conversion on the defined calculation range; a pilot signal extracting section operable to extract, for each transmission symbol, the pilot signals from the signal converted by the Fourier converting section; a transmission path characteristic estimating section operable to estimate a transmission path characteristic of all of the transmission symbols by interpolating the pilot signals extracted by the pilot signal extracting section using a time-direction interpolation filter; a waveform equalizing section operable to waveform-equalize the signal converted by the Fourier converting section based on the transmission path characteristic estimated by the transmission path characteristic estimating section and obtain CSI (Channel State Information); an inverse Fourier converting section operable to create a delay profile by performing an inverse Fourier conversion, for each transmission symbol, on the transmission path characteristic estimated by the transmission path characteristic estimating section; and a window control section operable to create a delay profile for defining a calculation range based on the delay profile created by the delay profile creating section and the delay profile created by the inverse Fourier converting section and to control the calculation range based on the delay profile for defining a calculation range, wherein the window control section applies, for the transmission symbol with a CSI level below a threshold value, the delay profile for defining a calculation range which is created with the previous transmission symbol.

With an OFDM demodulating apparatus and method thereof according to the embodiments of the invention, the generation of the trigger to an FFT window is allowed based on a right delay profile even in an atmosphere in motion.

BRIEF DESCRIPTION OF THE DRAWINGS

FIGS. 6A to 6D are diagrams describing an operation of a matched filter within a window recreating circuit;

FIG. 12 is a diagram showing an example of two delay profiles and the created delay profile for defining an FFT window;

FIGS. 13A and 13B are diagrams showing examples in which a delay profile is created from a correlation result in a guard interval correlating circuit within the window recreating circuit;

DETAILED DESCRIPTION

An OFDM receiving apparatus under ISDB-T (Integrated Services Digital Broadcasting-Terrestrial) standard according to embodiments of the invention will be described below.

Figure 1:
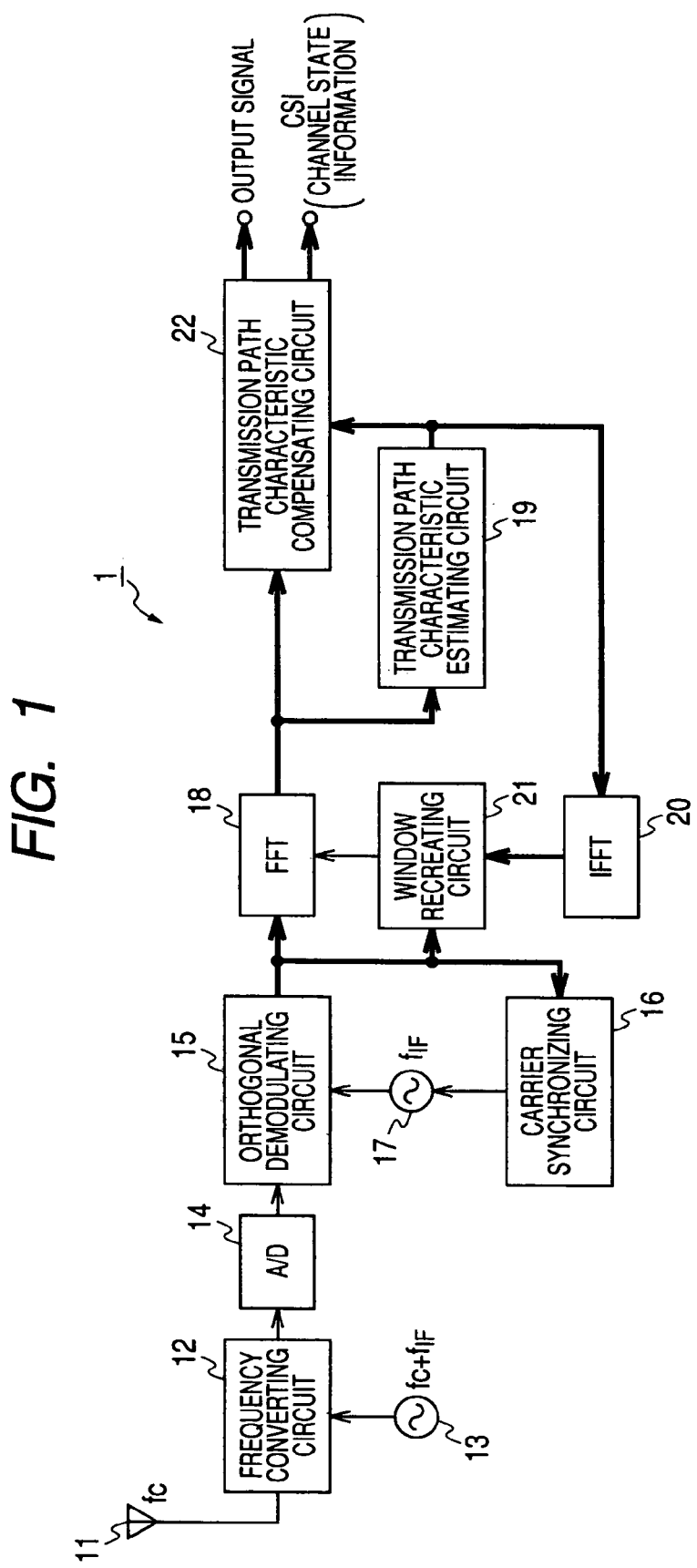
FIG. 1 is a block construction diagram of an OFDM receiving apparatus according to an embodiment of the invention.

FIG. 1 shows a block construction diagram of an OFDM receiving apparatus 1 according to an embodiment of the invention. Here, the thick lines indicate a signal component when the signal transmitted between blocks is a complex signal while the thin lines indicate a signal component when the signal transmitted between blocks is a real signal.

The OFDM receiving apparatus 1 includes, as shown in FIG. 1, an antenna 11, a frequency converting circuit 12, a local oscillator 13, an A/D converting circuit 14, an orthogonal demodulating circuit 15, a carrier synchronizing circuit 16, a local oscillator 17, an FFT calculating circuit 18, a transmission path characteristic estimating circuit 19, an IFFT calculating circuit 20, a window recreating circuit 21 and a transmission path characteristic compensating circuit 22.

A broadcasting wave of digital broadcasting transmitted from a broadcasting station is received by the antenna 11 of the OFDM receiving apparatus 1 and is supplied to the frequency converting circuit 12 as an RF signal at a carrier frequency fc.

In the frequency converting circuit 12, the RF signal received by the antenna 11 is multiplied by the carrier signal at a carrier frequency fc+fIF generated by the local oscillator 13, is thus frequency-converted to the IF signal at a middle frequency fIF and is supplied to the A/D converting circuit 14. The IF signal is digitized by the A/D converting circuit 14 and is supplied to the orthogonal demodulating circuit 15.

The orthogonal demodulating circuit 15 orthogonally demodulates the digitized IF signal by using the carrier signal at the middle frequency fIF, which is controlled by the carrier synchronizing circuit 16 and generated by the local oscillator 17, and outputs an OFDM signal in the base band. The OFDM signal in the base band, which is output from the orthogonal demodulating circuit 15, is a so-called signal in the time domain before FFT calculation is performed thereon. Therefore, the base band signal after orthogonal demodulation and before FFT calculation is called OFDM time-domain signal hereinafter. As a result of the orthogonal demodulation, the OFDM time-domain signal becomes a complex signal including a real-axis component (I-channel signal) and an imaginary-axis component (Q-channel signal). The OFDM time-domain signal output by the orthogonal demodulating circuit 15 is supplied to the carrier synchronizing circuit 16, the FFT calculating circuit 18 and the window recreating circuit 21.

The FFT calculating circuit 18 performs FFT calculation on the OFDM time-domain signal and extracts and outputs the orthogonally-modulated data to each sub-carrier. The signal output from the FFT calculating circuit 18 is a so-called signal in the frequency domain after FFT calculation is performed thereon. Therefore, the signal after FFT calculation is called OFDM frequency domain signal hereinafter.

The FFT calculating circuit 18 extracts signal in the range of valid symbol length (such as 2048 samples) from one OFDM symbol, that is, excludes the range for a guard interval from one OFDM symbol and performs FFT calculation on the extracted OFDM time-domain signal of the 2048 samples. More specifically, the calculation is started at some point in the range from the boundary of the OFDM symbol to the end of the guard interval. The calculation range is called FFT window.

The OFDM frequency domain signal output from the FFT calculating circuit 18 in this way is a complex signal each including a real-axis component (I-channel signal) and an imaginary-axis component (Q-channel signal) like the OFDM time-domain signal. The complex signal may be a signal having an amplitude orthogonally modulated by 16QAM scheme or 64 QAM scheme, for example. The OFDM frequency-domain signal is supplied to the transmission path characteristic estimating circuit 19 and the transmission path characteristic compensating circuit 22.

The transmission path characteristic estimating circuit 19 estimates the transmission path characteristic based on SP signals extracted from an OFDM frequency domain signal.

Figure 2:
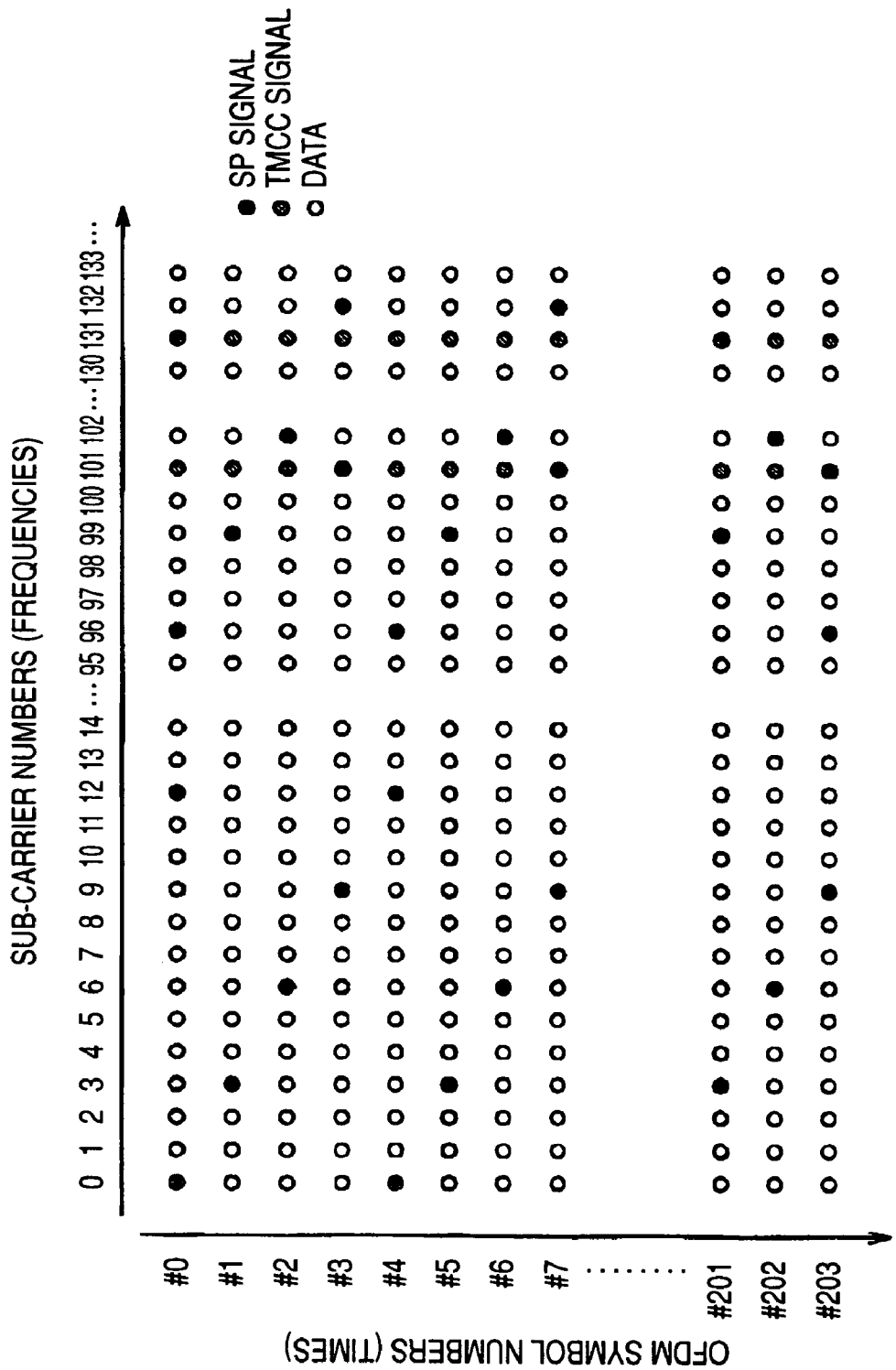
FIG. 2 is a diagram for explaining the position where an SP signal of an OFDM signal is to be inserted.

FIG. 2 shows an arrangement pattern of SP signals within an OFDM symbol, which is adopted in ISDB-T standard.

In ISDB-T standard, one BPSK-modulated SP signal is inserted every 12 sub-carriers in the sub-carrier direction (frequency direction). Furthermore, in ISDB-T standard, the position where the SP signal is inserted is shifted by three sub-carriers in each OFDM symbol. As a result, an SP signal is inserted every four OFDM symbols in one sub-carrier in the OFDM symbol direction (time direction). In this way, in ISDB-T standard, SF signals are spatially scattered in an OFDM symbol, whereby the redundancy of the SP signals is lowered for original information.

Figure 3:
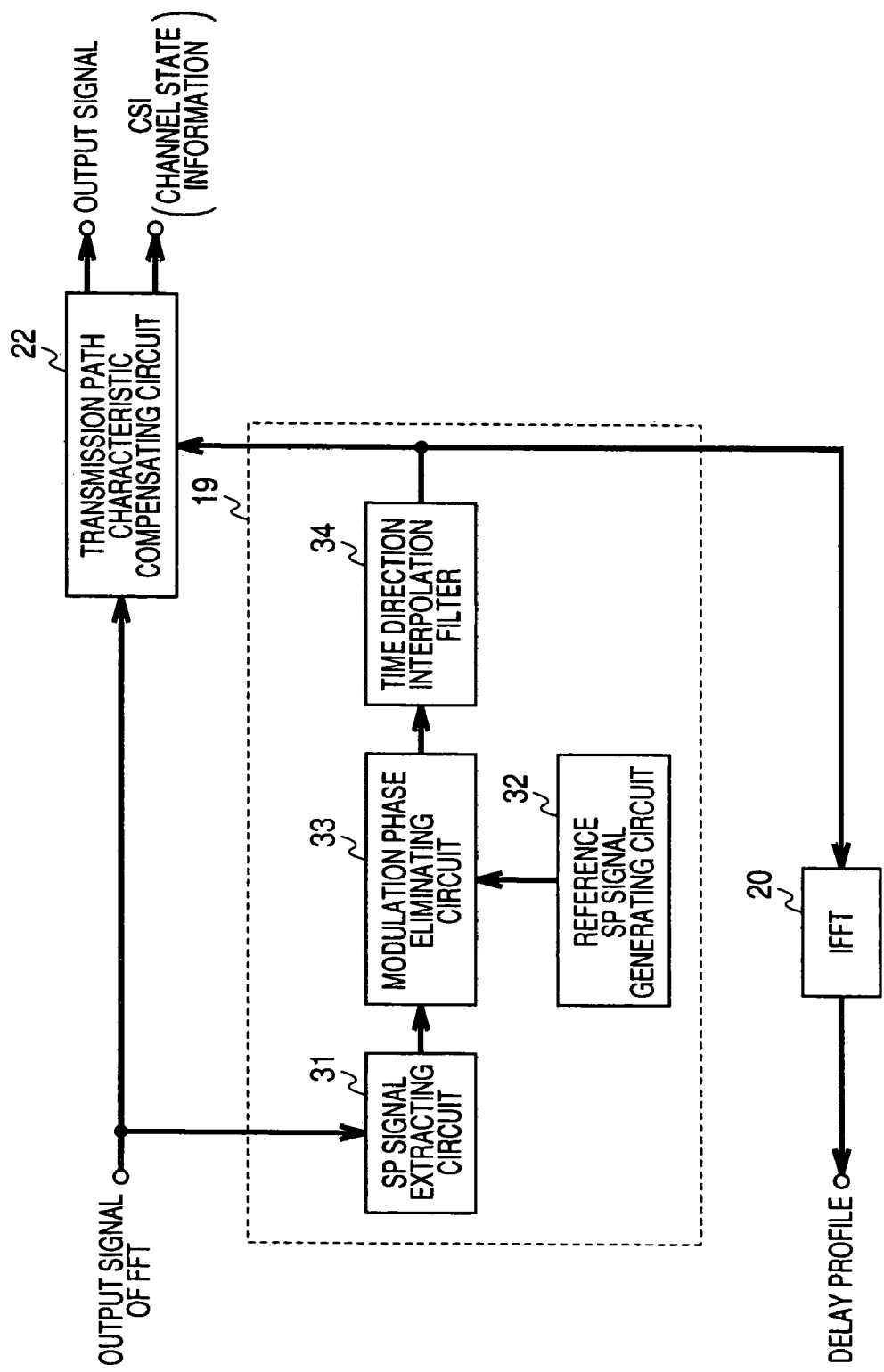
FIG. 3 is a block construction diagram of a transmission path characteristic estimating circuit within the OFDM receiving apparatus.

FIG. 3 shows a block construction diagram of the transmission path characteristic estimating circuit 19.

The transmission path characteristic estimating circuit 19 includes, as shown in FIG. 3, an SP signal extracting circuit 31, a reference SP signal generating circuit 32, a modulation phase eliminating circuit 33 and a time direction interpolation filter 34.

The SP signal extracting circuit 31 eliminates the information component from an OFDM frequency domain signal and extracts an SP signal only therefrom.

The modulation phase eliminating circuit 33 eliminates the modulated component of the extracted SP signal by using a reference SP signal generated by the reference SP signal generating circuit 32. The SP signal from which the modulated component is eliminated exhibits the transmission path characteristic of the sub-carrier to which the SP signal is inserted.

Figure 4:
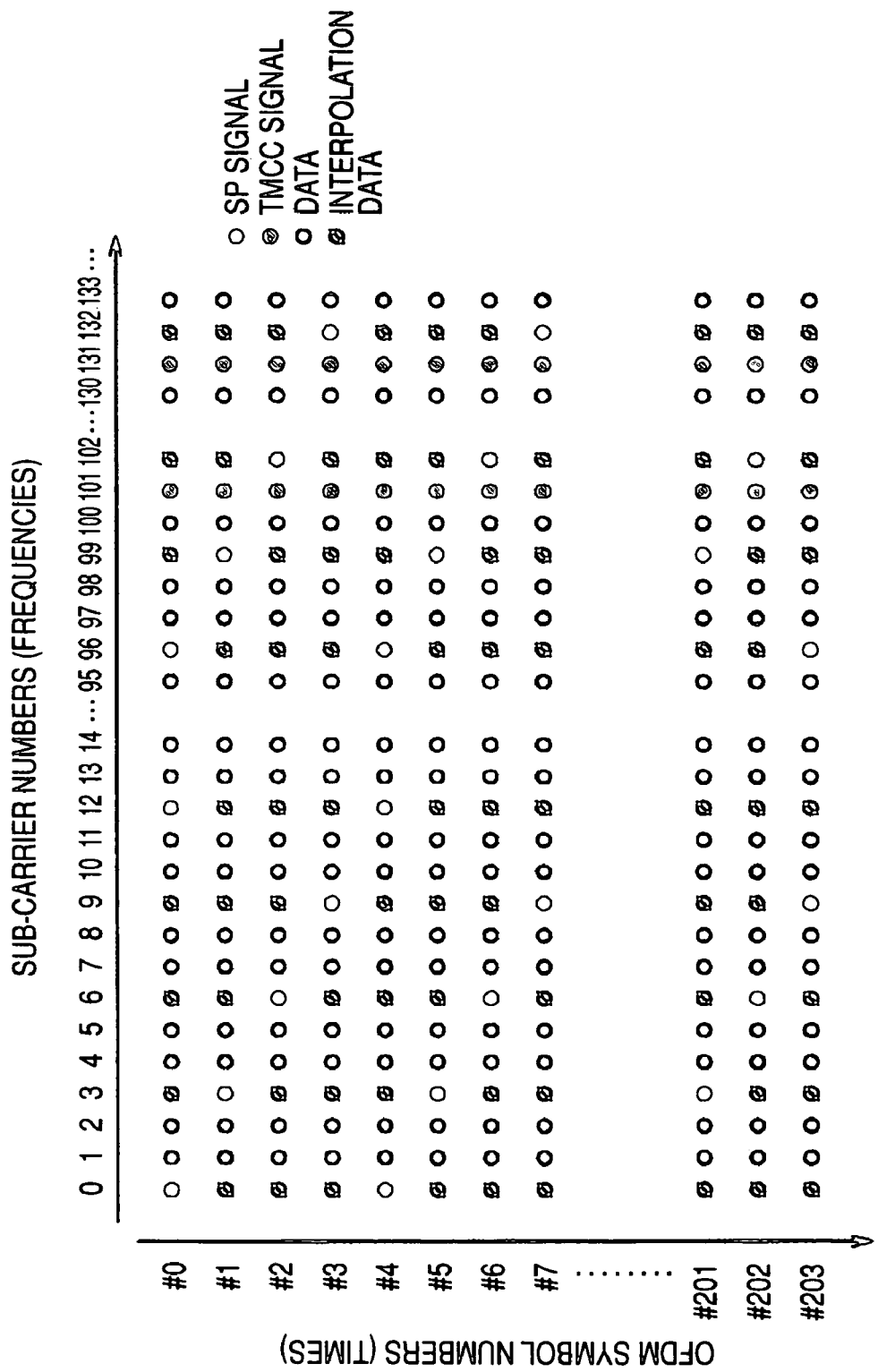
FIG. 4 is a diagram for explaining a sub-carrier, the transmission path characteristic of which is estimated by a time direction interpolation filter.

The time direction interpolation filter 34 performs time direction interpolation processing on the SP signals from which the modulated component is removed and estimates the transmission path characteristic of the sub-carrier containing the SP signals for each OFDM symbol. As a result, as shown in FIG. 4, the transmission path characteristic of every three sub-carriers in the frequency direction can be estimated for all OFDM symbols.

The transmission path characteristic estimating circuit 19 supplies the transmission path characteristic estimated in this way to the IFFT calculating circuit 20 and transmission path characteristic compensating circuit 22.

The IFFT calculating circuit 20 performs IFFT calculation on the transmission path characteristic estimated by the transmission path characteristic estimating circuit 19, thus creates a delay profile indicating the signal strength of each path and then supplies the created delay profile to the window recreating circuit 21.

The window recreating circuit 21 detects the symbol boundary of the first reached path in the OFDM frequency domain signal and identifies the FFT calculating range for the FFT calculating circuit 18 based on the detected symbol boundary position. The window recreating circuit 21 uses the OFDM frequency domain signal and the delay profile supplied from the IFFT calculating circuit 20 to detect the symbol boundary of the first reached path. The window recreating circuit 21 generates a trigger indicating the calculation starting timing based on the FFT calculation range and supplies the generated trigger to the FFT calculating circuit 18.

The transmission path characteristic compensating circuit 22 performs phase equalization and amplitude equalization on the OFDM frequency domain signal by using the transmission path characteristic estimated by the transmission path characteristic estimating circuit 19. The transmission path characteristic compensating circuit 22 outputs the OFDM frequency domain signal equalized in phase and amplitude and CSI (Channel State Information), which is an estimated SNR, to the outside.

Figure 5:
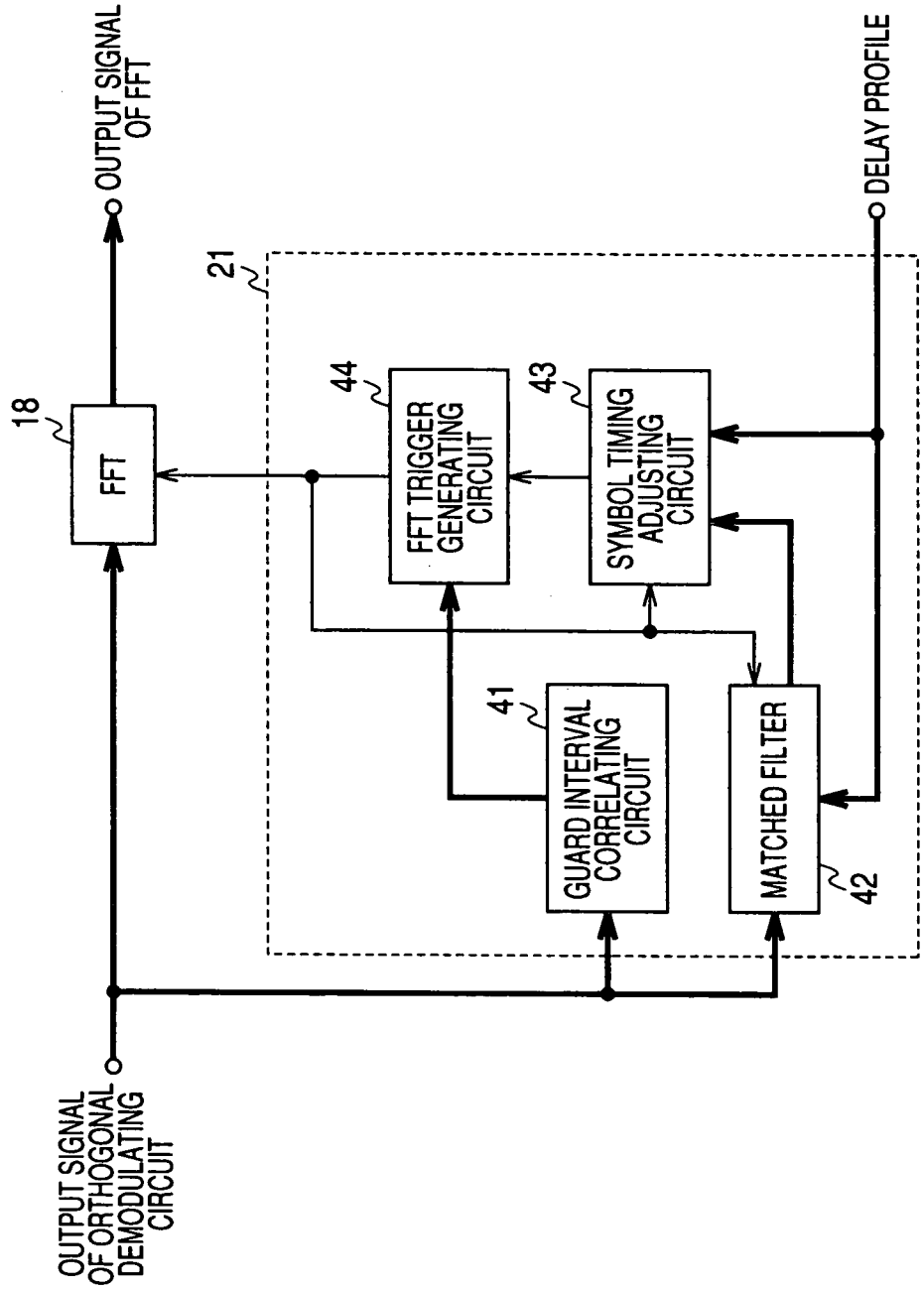
FIG. 5 is a block construction diagram of a window recreating circuit within the OFDM receiving apparatus.

Next, the window recreating circuit 21 will be described in more detail. FIG. 5 shows a block construction diagram of the window recreating circuit 21.

The window recreating circuit 21 includes, as shown in FIG. 5, a guard interval correlating circuit 41, a matched filter 42, a symbol timing adjusting circuit 43 and an FFT trigger generating portion 44.

The window recreating circuit 21 generates a rough trigger to an FFT window by using the output of the guard interval correlating circuit 41 upon synchronization of the OFDM symbol and, after synchronization, generates the trigger to the FFT window by using the output of the matched filter 42 and the delay profile supplied from the IFFT calculating circuit 20. In other words, after rough synchronization is established, more accurate symbol synchronization is performed, resulting in a stable recreating state.

The blocks within the window recreating circuit 21 will be described below.

The guard interval correlating circuit 41 delays the OFDM time domain signal by a valid symbol period and obtains the correlation between the guard interval part and the signal from which the guard interval is copied. Then, the guard interval correlating circuit 41 supplies the correlation signal exhibiting the correlation to the FFT trigger generating portion 44.

The matched filter 42 extracts the waveform of the guard interval part from the OFDM time domain signal and obtains the coherence between the waveform and the waveform of the second half of the OFDM symbol, whereby a delay profile exhibiting the signal strength of each path is created.

Operations of the matched filter 42 will be described with reference to FIGS. 6A to 6D. FIGS. 6A to 6D assume the state that a pre-echo signal exists in addition to the main signal.

First of all, the matched filter 42 extracts a signal in a guard interval part from each OFDM symbol of the main signal as shown in FIG. 6A. In this case, the pre-echo signal in the same time division is also simultaneously extracted. The matched filter 42 handles each sample of the extracted signal as a matched filter coefficient. The filter coefficient is fixed until the processing on each OFDM symbol ends. Notably, in order to extract the signal in a guard interval part from the main signal, the identification of the position may be required in advance. Then, the matched filter 42 locates the guard interval of the main signal in advance based on the output of the guard interval correlating circuit 41 and the delay profile supplied from the IFFT calculating circuit 20.

Next, the matched filter 42 shifts the matched filter by one sample to the waveform of the second half of the OFDM symbol as shown in FIG. 6B and thus obtains the coherence. In other words, the matched filter 42 determines whether the sample of the waveform of the second half of the OFDM symbol and the matched filter coefficient substantially agree or not for each sample and totalizes the determination results for all samples, whereby the coherence at the position can be obtained. At the position a in the case shown in FIG. 6B, the pre-echo signal agrees with the sample part of the main signal in the matched filter coefficient. At the position b, a part of the pre-echo signal agrees with a part of the sample part of the pre-echo signal in the matched filter coefficients, and the main signal agrees with the sample part of the main signal in the matched filter coefficient. At the position c, a part of the main signal agrees with the sample part of the pre-echo signal in the matched filter coefficient. As a result, the delay profile as shown in FIG. 6C can be obtained.

Next, the matched filter 42 eliminates noise and/or ghost from the delay profile. Here, the ghost and the pre-echo appear horizontally symmetrical with respect to the main path, and the ghost has a weaker signal strength than that of the pre-echo. Therefore, the matched filter 42 eliminates one with a lower signal strength as ghost of the paths appearing horizontally symmetrical with respect to the main path. As a result, the delay profile as shown in FIG. 6D is obtained.

The matched filter 42 supplies the delay profile created in this way to the symbol timing adjusting circuit 43.

The symbol timing adjusting circuit 43 receives the supply of the delay profiles from both of the matched filter 42 and the IFFT calculating circuit 20. The symbol timing adjusting circuit 43 combines the two delay profiles and thus creates a delay profile excluding a pseudo path and supplies the delay profile to the FFT trigger generating portion 44 as a delay profile for defining an FFT window.

When the FFT trigger generating portion 44 is supplied with a correlation signal from the guard interval correlating circuit 41, the FFT trigger generating portion 44 generates a pulse exhibiting "H" (high) at the peak of correlation values (that is, the rough trigger to a FFT window). The FFT trigger generating portion 44 further generates a trigger to an FFT window in timing of the first reached path upon receipt of the supply of the delay profile for defining an FFT window from the symbol timing adjusting circuit 43. The FFT trigger generating portion 44 supplies the generated trigger to the FFT calculating circuit 18.

Next, the symbol timing adjusting circuit 43 will be described in more detail.

As described above, the symbol timing adjusting circuit 43 combines the two delay profiles supplied from the matched filter 42 and IFFT calculating circuit 20 and thus creates a delay profile for defining an FFT window.

A case that the two delay profiles supplied from the matched filter 42 and IFFT calculating circuit 20 are simply combined to create a delay profile for defining an FFT window will be described below before describing an actual method of generating a delay profile for defining an FFT window in the symbol timing adjusting circuit 43.

Two delay profiles may be simply combined by performing AND calculation on each path of two delay profiles and only handling the path existing in both of them as a real path or by scoring the paths in two delay profiles based on the signal strength and frequency of occurrence and determining whether each of the paths is a real path or not based on the scores. The existence of a path at a given position may be determined only when the number of times of detection of the path in the delay profile after AND calculation performed on each path for the two delay profiles is equal to or higher than a threshold value $\alpha$. Thus, the false path due to noise can be securely eliminated.

Figure 7:
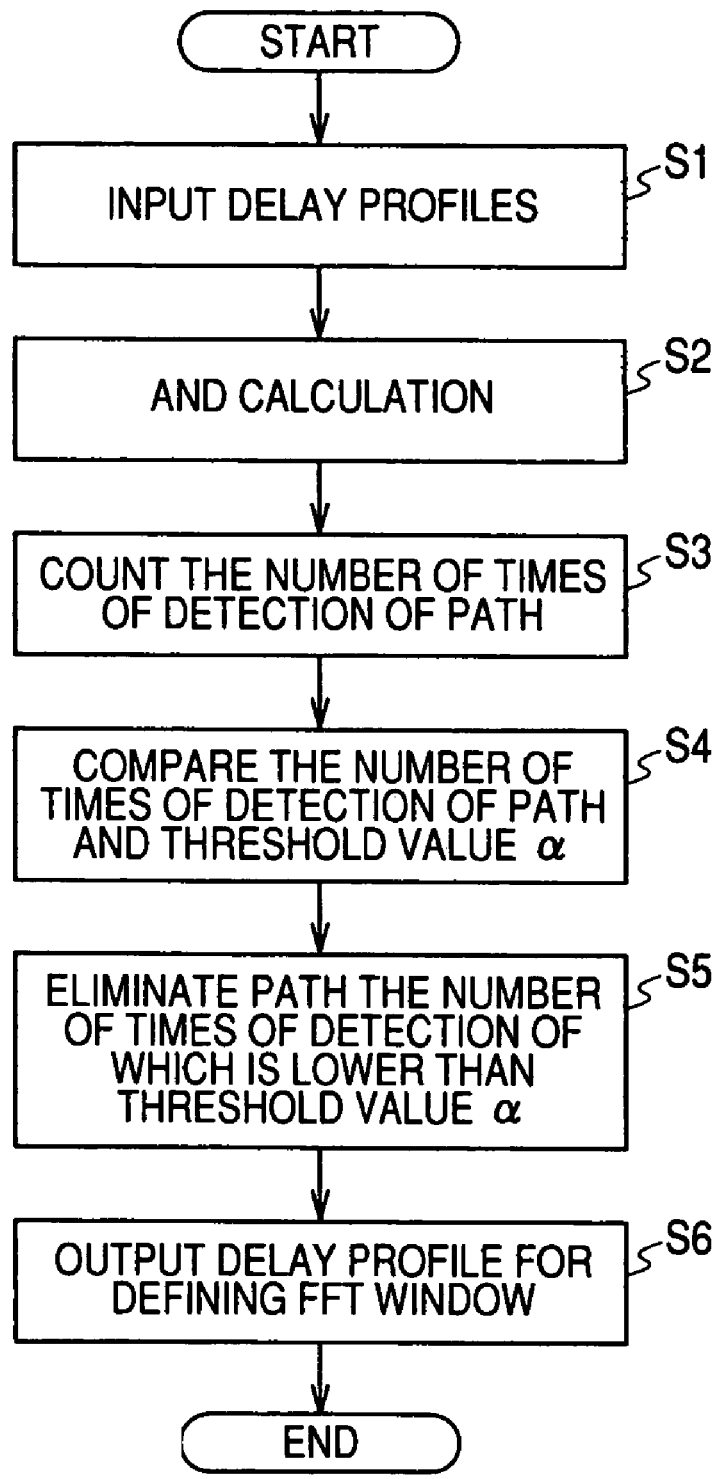
FIG. 7 is a flowchart describing operational steps of a symbol timing adjusting circuit within the window recreating circuit in order to create a profile for defining an FFT window by simply combining two delay profiles.

Operational steps of the symbol timing adjusting circuit 43 in order to perform an AND calculation on each path for the two delay profile will be described with reference to the flowchart in FIG. 7.

In step S1 first of all, the two delay profiles are input, and, in step S2, AND calculation is performed on each path in the two delay profiles. Next, in step S3, the number of times of detection of each path is counted, and, in step S4, the number of times of detection of each path is compared with the threshold value $\alpha$. In step S5, the path the number of times of detection of which is lower than the threshold value $\alpha$ is eliminated, and, in step S6, the resulting delay profile is output as a delay profile for defining an FFT window.

Figure 8:
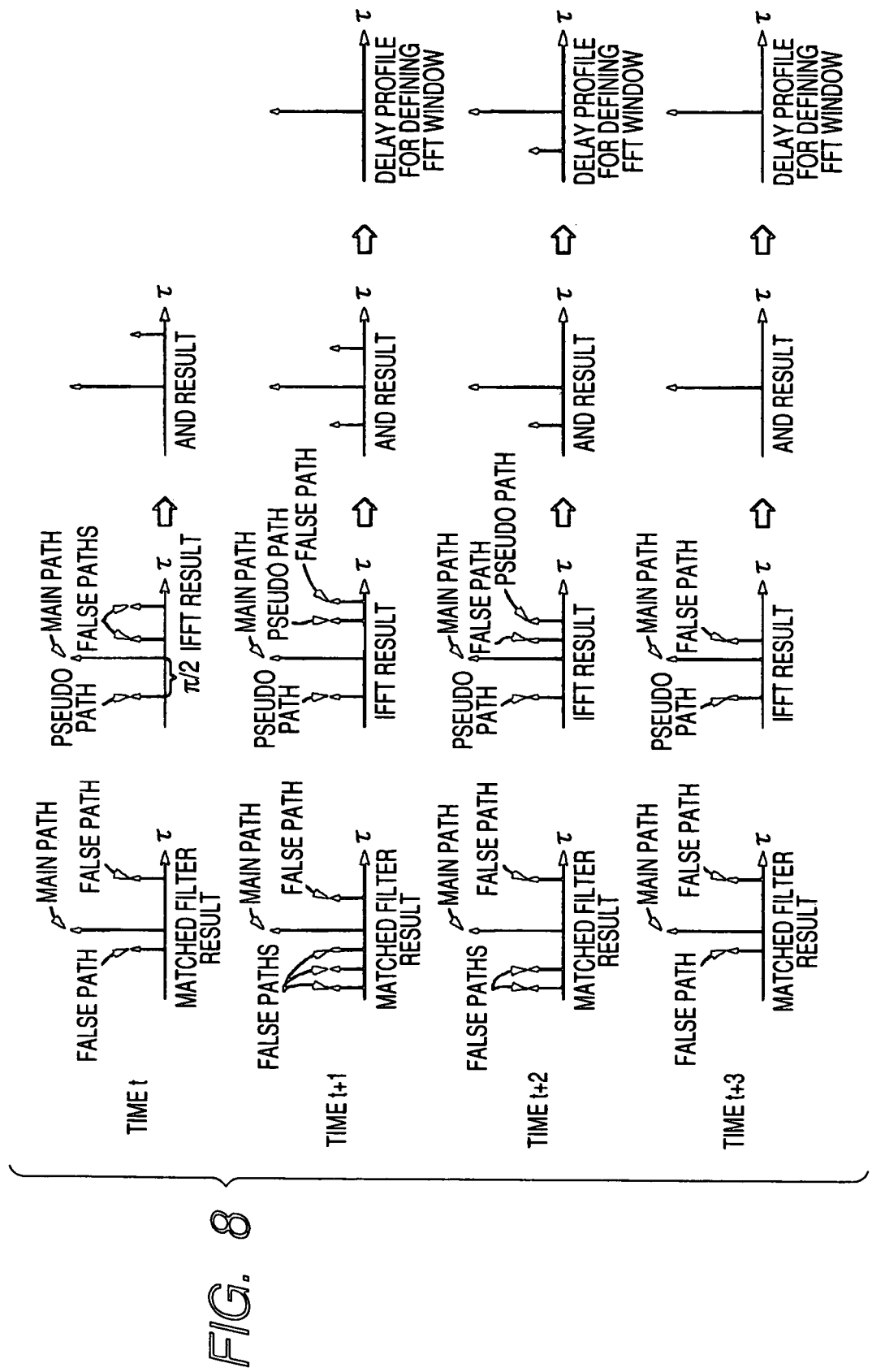
FIG. 8 is a diagram showing examples of two delay profiles and the created delay profiles for defining an FFT window.

FIG. 8 shows examples of the two delay profiles supplied from the matched filter 42 and IFFT calculating circuit 20 and a delay profile for defining an FFT window, which is created with the threshold value $\alpha=2$. As shown in FIG. 8, the two profiles supplied from the matched filter 42 and IFFT calculating circuit 20 have false paths due to noise. However, the false paths can be eliminated by performing AND calculation on each path.

By the way, when a transmission path characteristic fluctuates at a higher Doppler frequency and the time direction interpolation processing on SP signals does not satisfy the sampling theorem, a pseudo path, which does not actually exist, may occur in the delay profile supplied from the IFFT calculating circuit 20. The pseudo path continuously occurs every time at a same position (the position of $\pi/2$, $\pi$, $3\pi/2$ at a normalized frequency from the position of a real path). Thus, it is difficult to eliminate the pseudo path even by performing AND calculation on each path in the two delay profiles when the position of the false path in the delay profile supplied from the IFFT calculating circuit 20 agrees with the position of the pseudo path in the delay profile supplied from the matched filter 42. As a result, the pseudo path may be misdetermined as a real path. In reality, a pseudo path remains in the delay profile for defining an FFT window obtained at time t+2 in FIG. 8.

The pseudo path may be eliminated with a higher threshold value $\alpha$. However, with a higher threshold value $\alpha$, the following to the delay profile fluctuating under an atmosphere in motion may be delayed.

Accordingly, the symbol timing adjusting circuit 43 determines that a path, which may be possibly a pseudo path, exists at a given position and securely eliminates the pseudo path only when the number of times of the detection of the path in a delay profile after AND calculation is equal to or higher than a threshold value $\beta$ where the threshold value $\beta$ is actually provided in addition to the threshold value $\alpha$ ($\alpha<\beta$).

The operational steps of the symbol timing adjusting circuit 43 in this case will be described with reference to the flowchart in FIG. 9.

In step S11 first of all, the two delay profiles are input, and, in step S12, the path existing at the position of $\pi/2$, $\pi$, $3\pi/2$ from the position of the main path among the paths in the delay profile supplied from the IFFT calculating circuit 20 is determined as that the path may be possibly a pseudo path, and a pseudo path flag is added thereto. Next, in step S13, AND calculation is performed on each path for the two delay profiles, and, in step S14, the number of times of detection of each path is counted. Next, in step S15, whether each path has the pseudo path flag or not is determined. If not, the number of times of detection of the path without the pseudo path flag is compared with the threshold value $\alpha$ in step S16. In step S17, the path the number of detection of which is lower than the threshold value $\alpha$ is eliminated. On the other hand, if so, the number of times of detection of the path with the pseudo path flag is compared with the threshold value $\beta$ in step S18, and the path the number of times of detection of which is lower than the threshold value $\beta$ is eliminated in step S19. Then, in step S20, the resulting delay profile is output as a delay profile for defining an FFT window.

Figure 10:
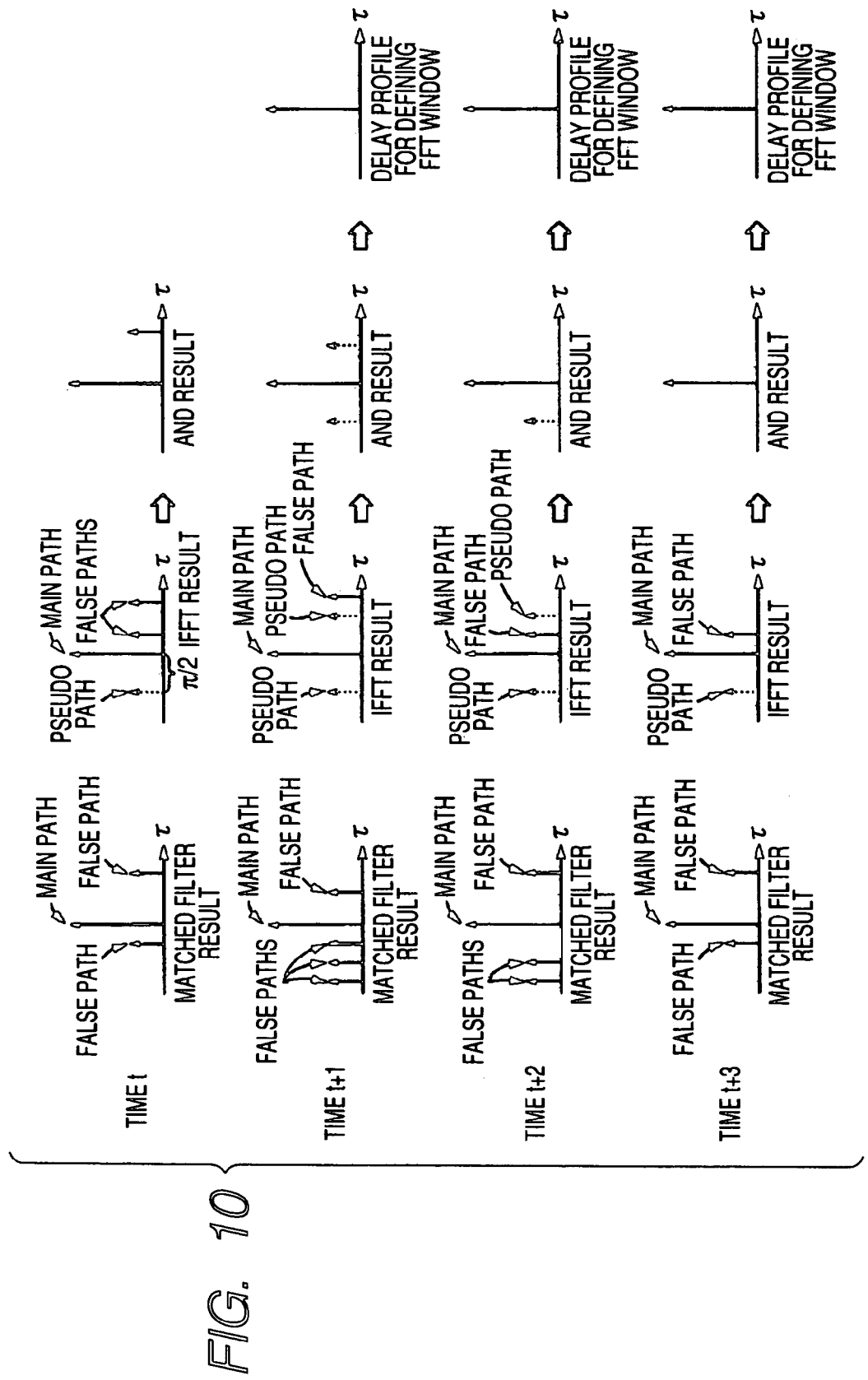
FIG. 10 is a diagram showing examples of two delay profiles and the created delay profile for defining an FFT window.

FIG. 10 shows examples of the two delay profiles supplied from the matched filter 42 and IFFT calculating circuit 20 and a delay-profile for defining an FFT window, which is created with the threshold values $\alpha=2$ and $\beta=4$. As shown in FIG. 10, the two delay profiles supplied from the matched filter 42 and the IFFT calculating circuit 20 have pseudo paths in addition to false paths due to noise. The path, which may be possibly a pseudo path indicated by the shown broken line is compared not with the threshold value $\alpha$ but with the threshold value $\beta$. Thus, the pseudo path can be securely eliminated.

Figure 9:
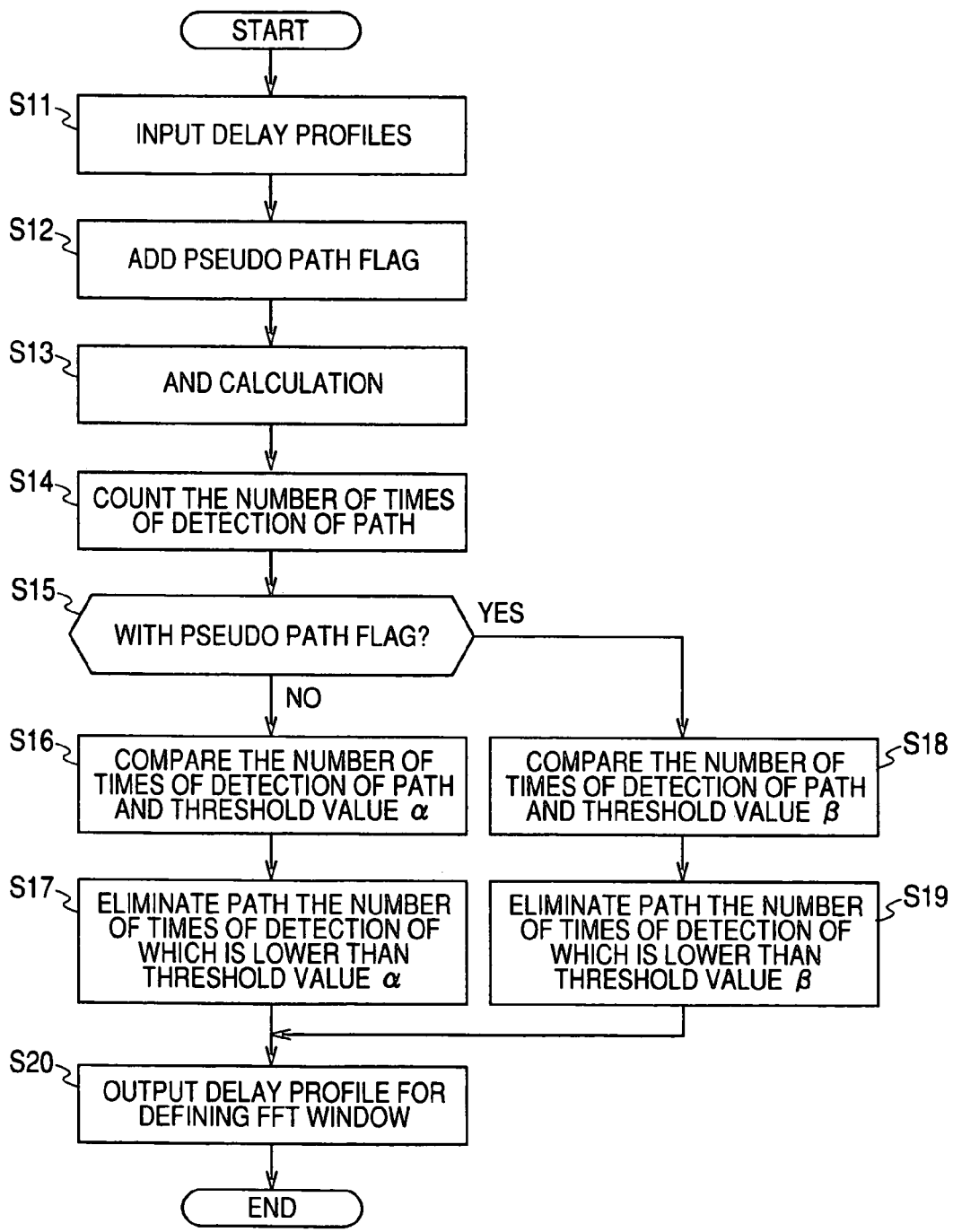
FIG. 9 is a flowchart describing operational steps of a real symbol timing adjusting circuit.

Having described the case in which AND calculation is performed on each path in the two delay profiles with reference to FIGS. 9 and 10, a pseudo path can be securely eliminated by sloping the scores of the path, which may be possibly a pseudo path, and the other path even in a case that a real path is determined based on scores in signal strength and/or occurrence frequency of paths in two delay profiles.

Next, a variation example of the symbol timing adjusting circuit 43 will be described.

In this variation example, the symbol timing adjusting circuit 43 determines whether a given delay profile is to be abandoned or not in accordance with the level of CSI output from the transmission path characteristic compensating circuit 22. In other words, if the level of CSI is lower than a threshold value $\gamma$ (that is, if the SNR is poor), the symbol timing adjusting circuit 43 determines that the delay profile has low reliability, abandons the delay profile and uses the delay profile for defining an FFT window, which is created for the previous OFDM symbol, as it is.

Figure 11:
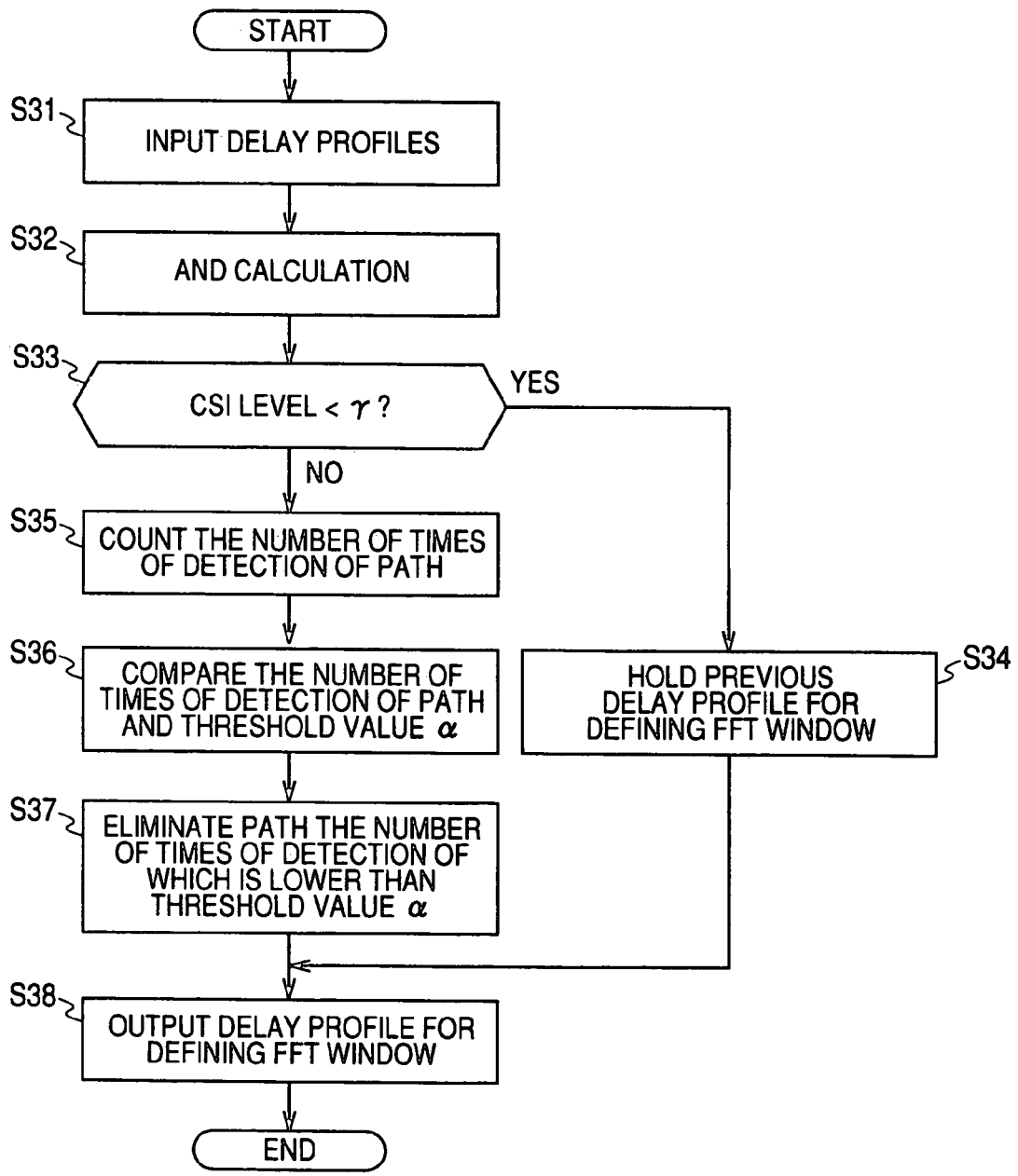
FIG. 11 is a flowchart describing operational steps of the symbol timing adjusting circuit in order to abandon a delay profile in accordance with a CSI level.
Figure 14:
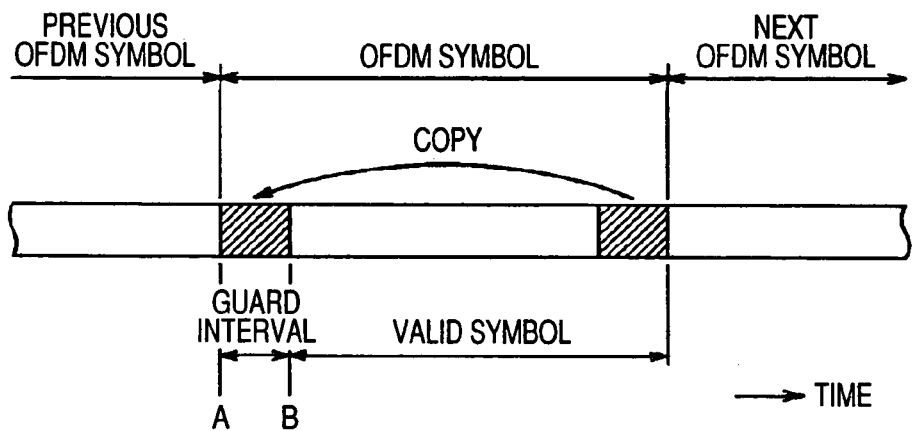
FIG. 14 is a diagram showing an OFDM signal, an OFDM symbol, a valid symbol, a guard interval and an FFT window.
Figure 15A:
FIGS. 15A and 15B are diagrams showing an example of the output of a time direction interpolation filter in cases in which the time-dependent fluctuation of the transmission path characteristic satisfies and does not satisfy a sampling theorem.
Figure 15B:
Figure 16:
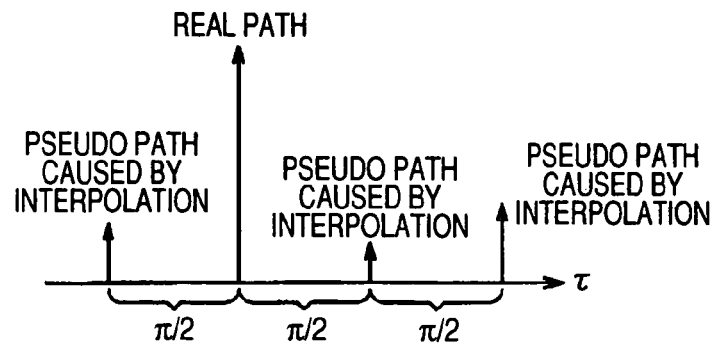
FIG. 16 is a diagram showing a delay profile resulting from IFFT calculation in a case when the time-dependent fluctuation of a transmission path characteristic does not satisfy a sampling theorem.

The operational steps of the symbol timing adjusting circuit 43 in this case will be described with reference to the flowchart in FIG. 11.

In step S31 first of all, two delay profiles are input, and, in step S32, AND calculation is performed on each path in the two delay profiles. Next, in step S33, whether the CSI level is lower than the threshold value $\gamma$ or not is determined. If the CSI level is lower than the threshold value $\gamma$, the delay profile is abandoned, and the delay profile for defining an FFT window, which is created for the previous OFDM symbol, is held in step S34. Then, the processing moves to step S38. On the other hand, if the CSI level is equal to or higher than the threshold value $\gamma$, the number of times of detection of each path is counted in step S35. Next, in step S36, the number of times of detection of each path is compared with the threshold value $\alpha$. In step S37, the path is eliminated if the number of times of detection of the path is lower than the threshold value $\alpha$. In step S38, the resulting delay profile is output as a delay profile for defining an FFT window.

FIG. 12 shows examples of the two delay profiles supplied from the matched filter 42 and IFFT calculating circuit 20 and the delay profile for defining an FFT window, which is created with the threshold values $\alpha=2$ and $\gamma=10$. As shown in FIG. 12, since the CSI level at time t+2 is 8 and is lower than the threshold value $\gamma$ (=10), the delay profile at time t+1 is used continuously. In this way, the generation of the trigger to an FFT window based on the delay profile with low reliability can be prevented even in an atmosphere in motion by using the delay profile for defining an FFT window, which is created for the previous OFDM symbol, if the CSI level is lower than the threshold value $\gamma$.

Notably, also in this variation example, like the case above, the threshold value $\beta$ may be provided in addition to the threshold value $\alpha$ ($\alpha<\beta$), and the position may be determined as having a path only if the number of times of detection of the path, which may be possibly a pseudo path, in the delay profile after AND calculation is equal to or higher than the threshold value $\beta$.

Having described the embodiments of the invention, the invention is not limited to the embodiments above, but various changes and modifications may apparently occur without departing from the scope of the invention.

For example, having described the delay profile created by the matched filter 42 and the delay profile created by the IFFT calculating circuit 20 are combined in the embodiment above, a delay profile may be created from the correlation result in the guard interval correlating circuit 41 without creating the delay profile in the matched filter 42. In this case, as shown in FIGS. 13A and 13B, a delay profile may be created by generating a path in the timing of the peak of the correlation value.

The invention claimed is:

1. An orthogonal frequency division multiplexing (OFDM) demodulating apparatus that handles a transmission symbol containing a valid symbol resulting from modulation of multiple sub-carriers by multiple pieces of data resulting from division of information and a guard interval resulting from a copy of a partial signal waveform of the valid symbol as a transmission unit and demodulates an OFDM signal with the transmission symbol having a predetermined sub-carrier discretely containing pilot signals with a specific amount of power and a specific phase, the apparatus comprising:

delay profile creating means for creating a delay profile from the OFDM signal by a predetermined method of a time domain;

Fourier converting means for defining a calculation range for a valid symbol period from each transmission symbol of the OFDM signal and for performing a Fourier conversion on the defined calculation range;

pilot signal extracting means for extracting, for each transmission symbol, the pilot signals from the signal converted by the Fourier converting means;

transmission path characteristic estimating means for estimating a transmission path characteristic of all of the transmission symbols by interpolating the pilot signals extracted by the pilot signal extracting means using a time-direction interpolation filter;

inverse Fourier converting means for creating a delay profile by performing an inverse Fourier conversion, for each transmission symbol, on the transmission path characteristic estimated by the transmission path characteristic estimating means; and window control means for creating a delay profile for defining a calculation range based on the delay profile created by the delay profile creating means and the delay profile created by the inverse Fourier converting means and for controlling the calculation range based on the delay profile for defining a calculation range, wherein the window control means creates the delay profile for defining a calculation range by leaving a path which exists at a same position in both the delay profile created by the delay profile creating means and the delay profile created by the inverse Fourier converting means and the number of times of detection of which path is equal to or higher than a threshold value and defines a higher threshold value for the path at a predetermined position from the position of the main path within the delay profile created by the inverse Fourier converting means than for the paths at the other positions, wherein the delay profile creating means creates the delay profile by extracting a signal waveform of the guard interval part of the main path from each of the transmission symbols of the OFDM signals and obtaining the coherence between the guard interval part and the other part of the transmission symbol.

2. An orthogonal frequency division multiplexing (OFDM) demodulating apparatus that handles a transmission symbol containing a valid symbol resulting from the modulation of multiple sub-carriers by multiple pieces of data resulting from the division of information and a guard interval resulting from a copy of a partial signal waveform of the valid symbol as a transmission unit and demodulates an OFDM signal with the transmission symbol having a predetermined sub-carrier discretely containing pilot signals with a specific amount of power and a specific phase, the apparatus comprising:

delay profile creating means for creating a delay profile from the OFDM signal by a predetermined method of a time domain;

Fourier converting means for defining a calculation range for a valid symbol period from each transmission symbol of the OFDM signal and for performing a Fourier conversion on the defined calculation range;

pilot signal extracting means for extracting, for each transmission symbol, the pilot signals from the signal converted by the Fourier converting means;

transmission path characteristic estimating means for estimating a transmission path characteristic of all of the transmission symbols by interpolating the pilot signals extracted by the pilot signal extracting means using a time-direction interpolation filter;

inverse Fourier converting means for creating a delay profile by performing an inverse Fourier conversion, for each transmission symbol, on the transmission path characteristic estimated by the transmission path characteristic estimating means;

window control means for creating a delay profile for defining a calculation range based on the delay profile created by the delay profile creating means and the delay profile created by the inverse Fourier converting means and for controlling the calculation range based on the delay profile for defining a calculation range; and waveform equalizing means for waveform-equalizing the signal converted by the Fourier converting means based on the transmission path characteristic estimated by the transmission path characteristic estimating means and obtaining CSI (Channel State Information), wherein the window control means creates the delay profile for defining a calculation range by leaving a path which exists at a same position in both the delay profile created by the delay profile creating means and the delay profile created by the inverse Fourier converting means and the number of times of detection of which path is equal to or higher than a threshold value and defines a higher threshold value for the path at a predetermined position from the position of the main path within the delay profile created by the inverse Fourier converting means than for the paths at the other positions, and wherein the window control means applies, for the transmission symbol with a CSI level below a threshold value, the delay profile for defining a calculation range which is created with the previous transmission symbol.

3. An orthogonal frequency division multiplexing (OFDM) demodulating apparatus that handles a transmission symbol containing a valid symbol resulting from modulation of multiple sub-carriers by multiple pieces of data resulting from division of information and a guard interval resulting from a copy of a partial signal waveform of the valid symbol as a transmission unit and demodulates an OFDM signal with the transmission symbol having a predetermined sub-carrier discretely containing pilot signals with a specific amount of power and a specific phase, the apparatus comprising:

delay profile creating means for creating a delay profile from the OFDM signal by a predetermined method of a time domain;

Fourier converting means for defining a calculation range for a valid symbol period from each transmission symbol of the OFDM signal and for performing a Fourier conversion on the defined calculation range;

pilot signal extracting means for extracting, for each transmission symbol, the pilot signals from the signal converted by the Fourier converting means;

transmission path characteristic estimating means for estimating a transmission path characteristic of all of the transmission symbols by interpolating the pilot signals extracted by the pilot signal extracting means using a time-direction interpolation filter;

waveform equalizing means for waveform-equalizing the signal converted by the Fourier converting means based on the transmission path characteristic estimated by the transmission path characteristic estimating means and obtaining CSI (Channel State Information);

inverse Fourier converting means for creating a delay profile by performing an inverse Fourier conversion, for each transmission symbol, on the transmission path characteristic estimated by the transmission path characteristic estimating means; and window control means for creating a delay profile for defining a calculation range based on the delay profile created by the delay profile creating means and the delay profile created by the inverse Fourier converting means and for controlling the calculation range based on the delay profile for defining a calculation range, wherein the window control means applies, for the transmission symbol with a CSI level below a threshold value, the delay profile for defining a calculation range which is created with the previous transmission symbol.

4. An orthogonal frequency division multiplexing (OFDM) demodulating method for use with an orthogonal frequency division multiplexing demodulating apparatus that handles a transmission symbol containing a valid symbol resulting from modulation of multiple sub-carriers by multiple pieces of data resulting from division of information and a guard interval resulting from a copy of a partial signal waveform of the valid symbol as a transmission unit and demodulates an OFDM signal with the transmission symbol having a predetermined sub-carrier discretely containing pilot signals with a specific amount of power and a specific phase, the method comprising:

creating a delay profile from the OFDM signal by a predetermined method of a time domain;

defining a calculation range for a valid symbol period from each transmission symbol of the OFDM signal and performing a Fourier conversion on the defined calculation range by use of a Fast Fourier Transform (FFT) circuit;

extracting, for each transmission symbol, the pilot signals from the signal converted by the Fourier conversion;

estimating a transmission path characteristic of all of the transmission symbols by interpolating the pilot signals extracted by the pilot signal extracting step using a time-direction interpolation filter;

waveform-equalizing the signal converted by the Fourier conversion based on the transmission path characteristic estimated by the transmission path characteristic estimating step and obtaining CSI (Channel State Information);

creating a delay profile by performing an inverse Fourier conversion by use of an Inverse Fast Fourier Transform (IFFT) circuit, for each transmission symbol, on the transmission path characteristic estimated by the transmission path characteristic estimating step; and creating a delay profile for defining a calculation range based on the delay profile created from the OFDM signal and the delay profile created by the inverse Fourier conversion and controlling the calculation range based on the delay profile for defining a calculation range, wherein the step of creating the delay profile for defining a calculation range applies, for the transmission symbol with a CSI level below a threshold value, the delay profile for defining a calculation range which is created with the previous transmission symbol.

5. An orthogonal frequency division multiplexing (OFDM) demodulating apparatus that handles a transmission symbol containing a valid symbol resulting from modulation of multiple sub-carriers by multiple pieces of data resulting from division of information and a guard interval resulting from a copy of a partial signal waveform of the valid symbol as a transmission unit and demodulates an OFDM signal with the transmission symbol having a predetermined sub-carrier discretely containing pilot signals with a specific amount of power and a specific phase, the apparatus comprising:

a delay profile creating section configured to create a delay profile from the OFDM signal by a predetermined method of a time domain;

a Fourier converting section configured to define a calculation range for a valid symbol period from each transmission symbol of the OFDM signal and to perform a Fourier conversion on the defined calculation range; a pilot signal extracting section configured to extract, for each transmission symbol, the pilot signals from the signal converted by the Fourier converting section;

a transmission path characteristic estimating section configured to estimate a transmission path characteristic of all of the transmission symbols by interpolating the pilot signals extracted by the pilot signal extracting section using a time-direction interpolation filter;

a waveform equalizing section configured to waveform-equalize the signal converted by the Fourier converting section based on the transmission path characteristic estimated by the transmission path characteristic estimating section and obtain CSI (Channel State Information);

an inverse Fourier converting section configured to create a delay profile by performing an inverse Fourier conversion, for each transmission symbol, on the transmission path characteristic estimated by the transmission path characteristic estimating section; and a window control section configured to create a delay profile for defining a calculation range based on the delay profile created by the delay profile creating section and the delay profile created by the inverse Fourier converting section and to control the calculation range based on the delay profile for defining a calculation range, wherein the window control section applies, for the transmission symbol with a CSI level below a threshold value, the delay profile for defining a calculation range which is created with the previous transmission symbol.

* * * * *